UNITED STATES PATENT OFFICE.

JAMES P. SCOTT, OF PHILADELPHIA, PENNSYLVANIA, ASSIGNOR TO THE AMERICAN ARTIFICIAL STONE PAVEMENT COMPANY, (LIMITED,) OF SAME PLACE.

MANUFACTURE OF COMPOSITE PAVEMENT.

SPECIFICATION forming part of Letters Patent No. 318,043, dated May 19, 1885.

Application filed March 21, 1885. (No specimens.)

*To all whom it may concern:*

Be it known that I, JAMES P. SCOTT, a citizen of the United States, residing in the city of Philadelphia, in the State of Pennsylvania, have invented certain new and useful Improvements in Manufacture of Composite Pavement, of which the following is a full, clear, and exact description.

My invention relates to the manufacture of artificial - stone pavement in which the pavement is built up in the usual manner in layers, first, of a foundation; second, of concrete; and, lastly, a top surface of composite; and it consists in preparing such top surface or pavement proper by uniting hydrated silicate of calcium and alumina in the form of Portland or Roman cement with hydraulic limestone and applying the same over the layer of concrete while in a plastic state, so that when hardened by the action of the atmosphere the resultant surface will be an artificial stone.

It has been a common practice in laying composition pavements to use a sub-bed of concrete over a foundation of slag, cinder, broken stone, &c., and with a surface-bed of cement having small pieces of broken stone embedded in its surface; but the difficulty with such has been to attain anything approaching homogeneity between the cement and the crushed or broken stone forming the surface-bed. In consequence such pavements have always proved ineffective and liable to speedy deterioration and destruction from moisture and changes of temperature, various expedients—such as dividing into blocks, &c.—being resorted to to prevent such result. With my composition blocks or sheets of any size can be used which will not be injuriously affected by the causes mentioned.

I have discovered that by adding to Portland or Roman cement any natural stone containing in a natural state the same principal elements—viz: calcium and alumina—found in such cement, (the stones being crushed or broken into small cubes or pieces,) the resultant product will be a practically homogeneous mass. As these cements mentioned are obtained by calcining argillaceous stone containing silicate of alumina, the stone being thus deprived of its carbonic acid, resultant product with the addition of water is chemically hydrated silicate of calcium and alumina. All limestone, notably hydraulic limestone, marble, and chalk, contain this composition in the natural state, and these are to be crushed or broken into small pieces or cubes of a quarter-inch or smaller in face and mixed in about equal proportions with the cement described, and thoroughly amalgamated, with the addition of water to the mass to render the mixture plastic and capable of being spread.

I do not confine myself to using equal proportions of crushed limestone and cement, as they may vary for different purposes without changing the character and result of my invention.

In laying a pavement in this manner the ground is dug out to a depth varying according to the nature of the soil, climate, and the strain to which the pavement is to be put. A foundation-bed is laid of slag, cinder, brick, stone, or other material free from earthy matter, and upon this is placed a sub-surface from one to several inches in thickness, of concrete or cement and broken stone, slag, or gravel, in varying proportions, preferably two of the former to three of the latter, and finally upon this is spread my new surface composition, which may be divided off into squares or blocks, the under or sub surface being rolled or compressed in the usual manner before laying the wearing or surface composition. This composition, prepared and applied in the manner described, produces a strong and durable pavement, not liable to deteriorate from the action of the atmosphere, and that will stand any reasonable strain, wearing evenly, and that will not be injuriously affected by changes of temperature.

Having thus described my invention, what I claim is—

1. A composite or wearing surface for a pavement or other analogous use, composed of Portland or other natural cement containing silicate of calcium and alumina thoroughly mixed with any hydraulic limestone that contains or is composed of calcium, alumina, and silica broken or crushed into small cubes or pieces, substantially as set forth.

2. The herein-described mode of making an artificial stone for pavement and other analogous use, consisting in breaking or crushing into small cubes of pieces natural hydraulic limestone which contains or is composed of calcium and alumina, and adding thereto Portland or other natural cement containing silicate of calcium and alumina, and thoroughly amalgamating the same with sufficient water to reduce the mixture to a plastic state, and molding or spreading the same over a suitable foundation as a wearing-surface, substantially as described.

In testimony whereof I have hereunto affixed my signature this 20th day of March, A. D. 1885.

JAMES P. SCOTT.

Witnesses:
FRANCIS S. BROWN,
H. T. FENTON.